United States Patent Office 2,800,135
Patented July 23, 1957

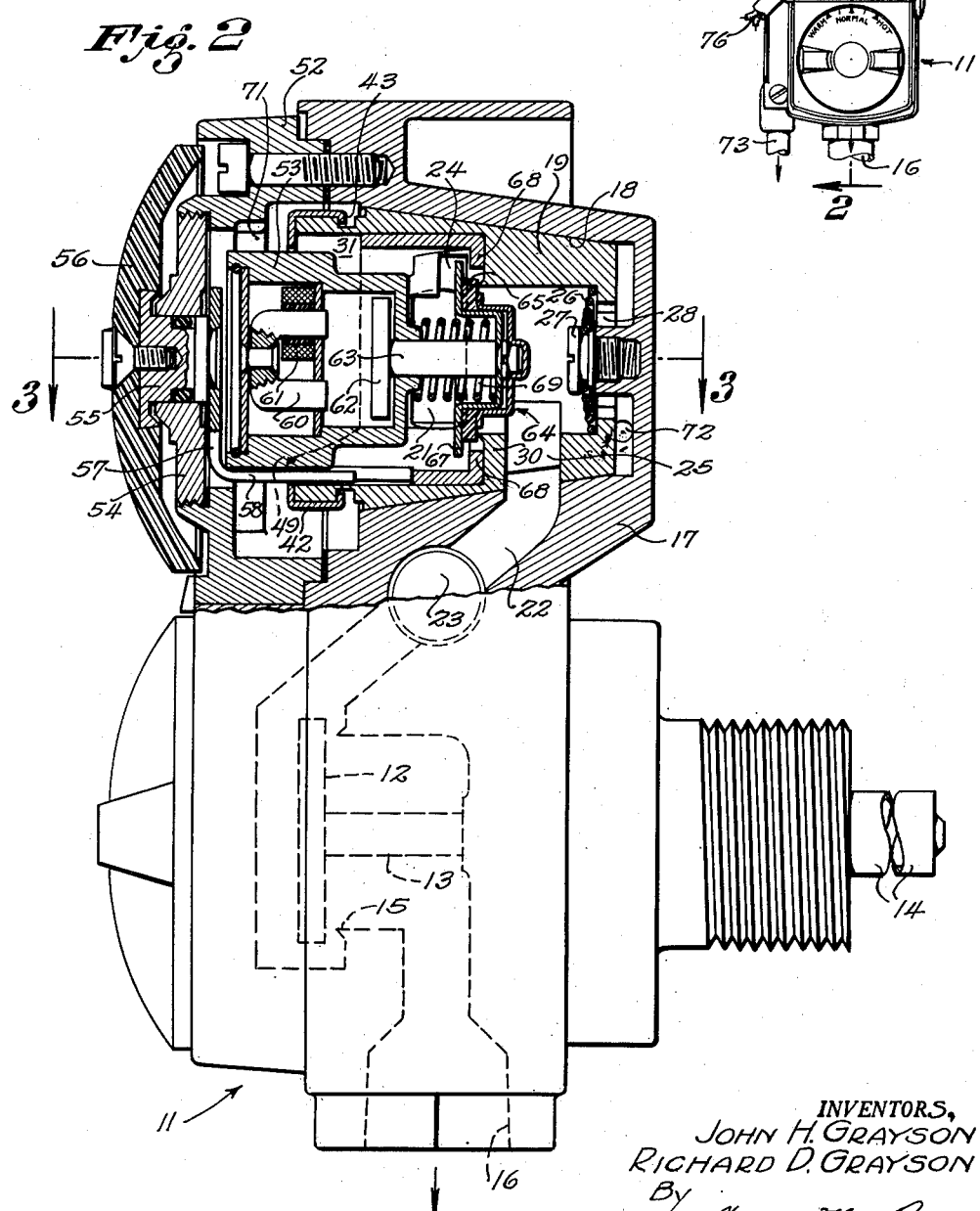

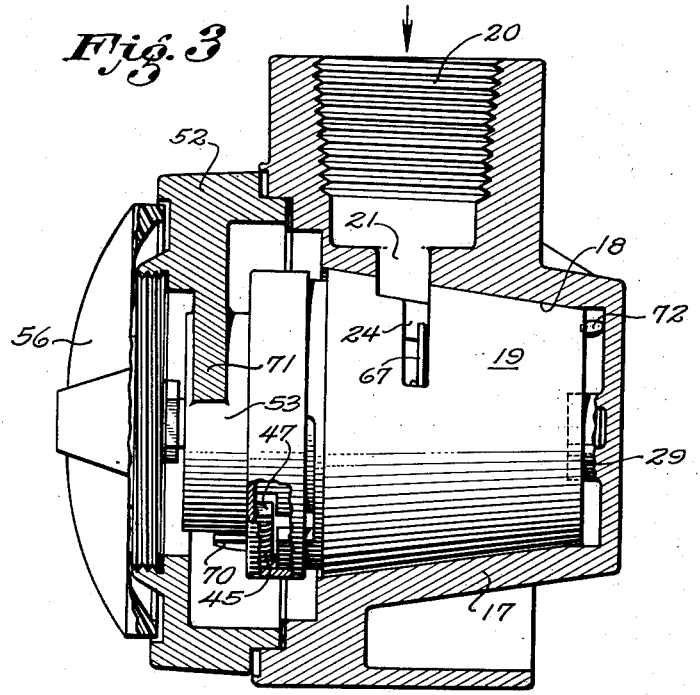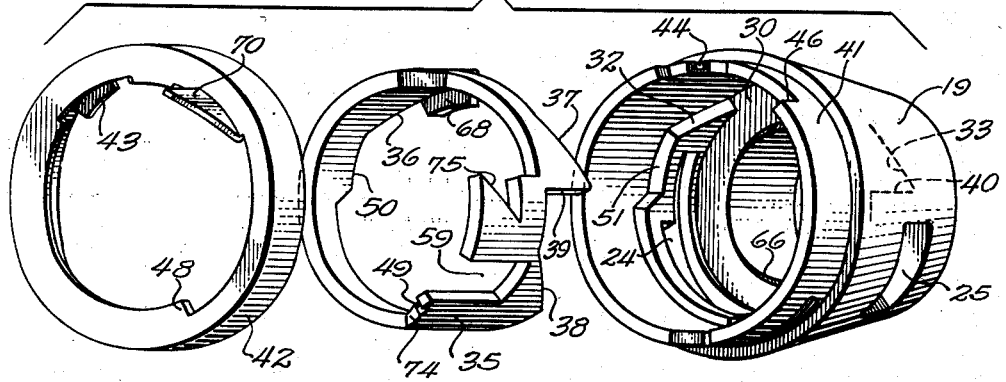

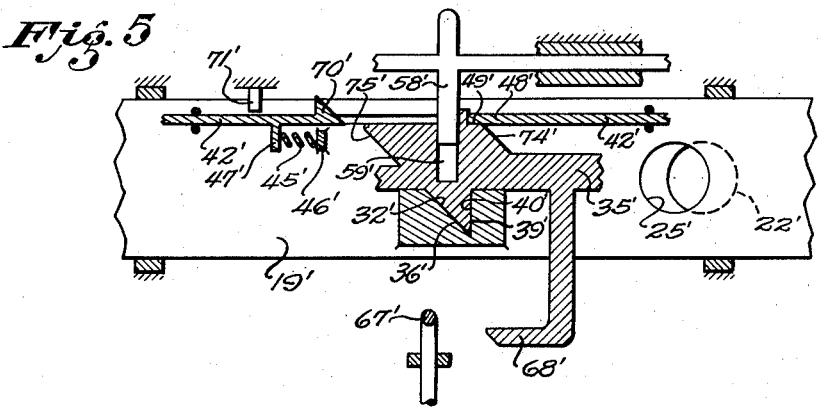
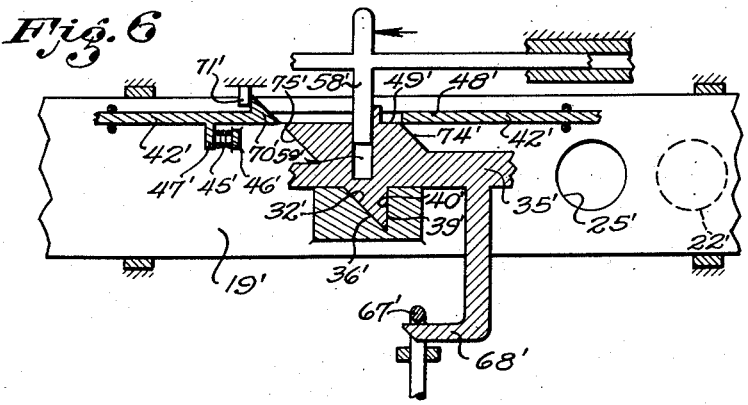
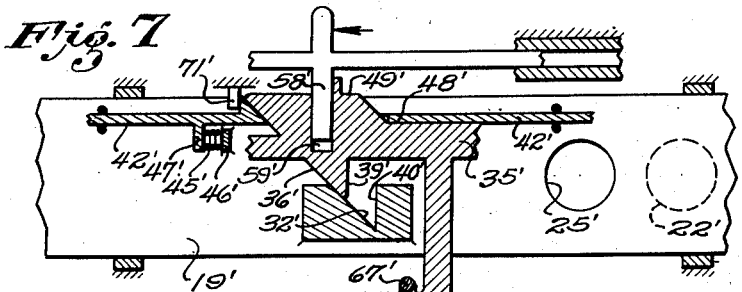
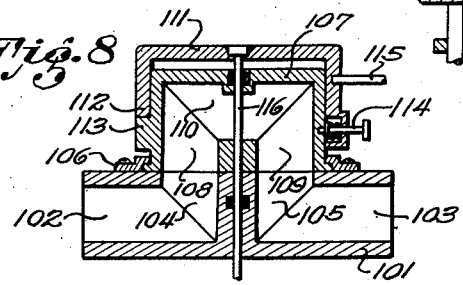

2,800,135

VALVE STRUCTURE

John H. Grayson, Monrovia, and Richard D. Grayson, La Canada, Calif., assignors to General Controls Co., Glendale, Calif., a corporation of California Application December 28, 1953, Serial No. 400,736

14 Claims. (Cl. 137—66)

This invention relates to valve structures and more particularly to those of the type which include a main closure member in the form of an apertured plug or disk rotatable to control the flow of fluid such as fuel-gas; a supplemental control device such as a safety shut-off valve, pilot-burner valve, or a gas-igniter actuator; and a common operating member for rotating the main closure member and for actuating the supplemental control device. A valve structure of this character is disclosed in the copending application of William A. Ray, Serial No. 240,305 filed August 4, 1951, now Patent No. 2,664,103.

It is an object of this invention to arrange the operating member so that it is rigidly interlocked with the main closure member during normal operation of the same, but is free to move relative to the main closure member to actuate the supplemental control device after the main closure member has been rotated to a given flow-controlling position. Because of this freedom of movement between the operating member and the main closure member there is no possibility of the supplemental control device being influenced by the friction inherent in a valve having a closure member of the rotary plug or disk type.

Another object of the invention is to provide means whereby an axial component of movement is imparted to the operating member when it is rotated to actuate the supplemental control device.

Another object is to arrange the supplemental control device in a cavity inside the main closure member.

Another object, when the main closure member is in the form of a rotary plug, is to arrange the operating member in a cavity inside the plug.

Another object is to provide, in said plug-cavity, electromagnetic means for influencing the supplemental control device.

Another object is to provide a valve structure of the character described whose controlling parts are arranged so that they are removable from the front of the structure.

For full understanding of the invention, and further appreciation of its objects and advantages, reference is to be had to the following detailed description and accompanying drawing, and to the appended claims.

In the drawing:

Figure 1 is a front elevation of a valve structure embodying this invention;

Figure 2 is a partial section, to enlarged scale, taken along the line 2—2 of Fig. 1;

Figure 3 is a section taken along the line 3—3 of Fig. 2, showing the internal parts in elevation;

Figure 4 is an exploded view, in perspective, of the rotatable control unit comprising plug member 19, operating member or sleeve 35, and locking ring 42; these parts being shown, for the sake of clarity, rotated from their positions as shown in Figs. 2 and 3;

Figure 5 is a diagram corresponding generally to a developed view of the inside of the rotatable unit shown in Fig. 4;

Figures 6 and 7 are views similar to Fig. 5 but showing the parts in different positions assumed in operation; and Figure 8 is a generally diagrammatic view, in section, of a modified form of the invention.

In Figs. 1–4 the present invention is shown, by way of example, as applied to apparatus for controlling supply of fuel to the gas burner of a water heater of the storage-tank type. In the lower half of the structure shown in Figs. 1 and 2 is a thermostatic valve 11 of conventional construction which, as is indicated by the broken lines, comprises a closure 12 having a stem 13 which is operatively connected, as through the usual snap-action means, to a thermostatic unit 14 of the rod-and-tube type adapted to respond to the temperature of the water and to effect operation of closure 11 into and out of engagement with its seat 15 in accordance with the requirement for supply of gas to the burner by way of outlet 16.

Referring now to the upper part of the structure of Figs. 1 and 2, and to Figs. 3 and 4, the numeral 17 indicates a casing having a tapered socket 18 for a conforming plug member 19, the socket being in communication with the inlet 20 of the structure by way of an opening 21, and with the inlet of the thermostatic valve 11 by way of an angled outlet passage 22 wherein is an adjustable flow restriction in the form of a threaded plug 23.

The plug 19 is hollow and has through its side wall an irregularly shaped inlet opening 24 and an outlet opening 25 which, when the plug is in its full-flow or "on" position as shown in the figures, are substantially in register with the inlet and outlet openings 21 and 23 of the casing. The plug is maintained snugly seated in its socket by the force of a dished spiral spring 26 fastened at its center to the casing by a screw 27 and bearing at its margin on a shoulder inside the plug. At the bottom of the plug and on the casing are cooperating stop portions 28 and 29 which limit rotation of the plug in clockwise direction. Rotation of the plug in the opposite direction is limited by other means, to be described.

Inside the plug 19, at its larger-diameter end and to the left of a shoulder portion 30 in the plug, is a generally cylindrical cavity 31 with which the inlet opening 24 communicates. Near the end of this cavity toward shoulder 30 the side wall of the cavity is built-up or reduced in diameter and is formed to provide a plurality of similar inclined edges or cam surfaces, one of which surfaces is indicated at 32 in Fig. 4, and another by a broken line 33 in the same figure. It is to be remembered that in Fig. 4 the parts are shown rotated from the positions of Figs. 2 and 3.

Within the plug-cavity 31 is a sleeve 35, whose outside diameter conforms to the larger-diameter surface of the cavity wall, having inclined inner edges or cam surfaces 36, 37 and 38 which mate with the cam surfaces inside the plug member, surfaces 36 and 37 mating with surfaces 32 and 33, respectively. The sleeve 35 also has edges, parallel to its axis and adjacent each of its inclined edges 36—38, which mate with similar edges inside the plug, one of these sleeve-edges being indicated at 39 in Fig. 4 and the mating edge inside the plug by a broken line 40 in the same figure. In production, the plug and sleeve are produced by die-casting.

The outer surface of plug 19 at its larger-diameter end is cylindrical as indicated at 41 in Fig. 4. Fitting on the plug around this surface is a lock-ring 42 which is formed of sheet metal and has a pair of diametrically opposite inwardly-projecting fingers fitting in elongated slots in the outer surface of the plug, one of the fingers and its cooperating slot being indicated at 43 and 44, respectively, in Fig. 4. The lock-ring 42 is mounted for rotation relative to the plug through a small angle and is biased in counterclockwise direction by the force of a spring 45 (Fig. 3) compressed between a shoulder 46

(Fig. 4) on the plug and a tongue 47 (Fig. 3) on the ring.

The lock-ring 42 has a portion 48 which projects radially inward from its outer end and forms an abutment cooperable with an end surface 49 of an extension of sleeve 35. When the ring is in its biased position its portion 48 overlaps and is closely adjacent to the surface 49 of the sleeve, so that movement of the sleeve in a direction outwardly of the plug is prevented. Movement of the sleeve in the opposite direction (inwardly of the plug) is also prevented by interengaging surfaces of the sleeve and plug, indicated respectively at 50 and 51 in Fig. 4, in a plane transverse to the axis of the plug. Rotation of the sleeve in counterclockwise direction relative to the plug is then also prevented by the cooperating cam surfaces 36 and 32 (since the sleeve cannot move outwardly of the plug), and in clockwise direction by the edges 39 and 40. It is thus apparent that when the lock-ring is in its normal or biased position the sleeve and the plug form an interlocked unit rotatable to control flow through the valve casing.

Secured to the left-hand or front end of casing 17 is a structure 52 having an integral hollow central portion 53 which projects into the plug-cavity 31. Threaded in an opening in the outer end of this structure is a disk 54 having a central bore wherein a short stem 55 is sealingly mounted. Secured to the outer end of this stem is a handle or knob 56, and to its inner end an arm 57 having a bent end portion 58 which is rotatable in a slot in structure 52 (around its central portion 53) and fits in a notch 59 in sleeve 35, so that rotation of knob 56 causes corresponding rotation of the sleeve.

Secured inside the hollow central portion 53 of structure 52 is an electromagnet comprising a U-shaped core 60 and a coil 61 whose external leads are indicated at 76 in Fig. 1. The electromagnet cooperates with a disk-shaped armature 62 having a stem 63 guided in an opening through the inner end of the structure-portion and carrying a closure structure generally indicated at 64. This structure comprises a closure disk 65 cooperable with a knife-edged seat 66 (see Fig. 4) around the inner edge of the shoulder portion 30 of the plug, and a centrally-cupped disk 67 whose margin is engageable by a pair of lugs 68, projecting radially inward from the inner end of sleeve 32, when the sleeve is moved in a direction outwardly from plug 19 in a manner to be described. The closure structure 64 is shown in seated position (and armature 62 widely spaced from electromagnet 60—61) and is urged to that position by the force of a spring 69 compressed between it and the structure-portion 53. The electromagnet is adapted to be energized by conventional means responsive to a condition which is essential for safe operation of the system, such as existence of flame at a pilot burner. As shown in Fig. 2 the electromagnet is deenergized and the closure structure 64 therefore in released position so that flow through the valve casing is obstructed regardless of the fact that the plug is in its full-flow or "on" position.

To reset the supplemental control device or safety valve means 64, the knob 56 is first turned through 90° in counterclockwise direction to "pilot" position so that, through arm portion 58, the unit comprising sleeve 35, plug 19 and lock-ring 42 is correspondingly rotated to a position wherein the outlet opening 25 of the plug is out of communication with the outlet passage 22, but the smaller end of the elongated inlet opening 24 of the plug is still in communication with the inlet 20—21 of the casing. (The reason that this end of opening 24 is made smaller is merely to avoid breaking into the surface 51 inside the plug).

When the knob reaches its "pilot" position, a projection 70 on the outer face of the lock-ring comes into engagement with a stop 71 formed by a portion of structure 52 by which its central portion 53 is joined. When the knob is then turned farther, toward "reset" position, since rotation of the lock-ring in counterclockwise direction is then prevented by stop 71, the sleeve and plug rotate through a small angle relative to the lock-ring (against the force of its bias spring 45) to a position wherein the end surface 49 of the sleeve is clear of the normally-overlapping portion 48 of the lock-ring (so that this ring is in unlocking position) and the sleeve is then free to move axially in a direction outwardly of the plug as, by continued rotation of the knob, the cam surfaces (such as 36) of the sleeve slide on the cooperating cam surfaces (such as 32) of the plug—rotation of the plug itself being prevented by the lock-ring spring 45 which is arranged so that it is fully compressed when the ring is in unlocking position. The depth of sleeve-notch 59 is sufficient to accommodate the driving arm-portion 58 when the sleeve is in its outwardly projected position.

In the outward movement of the sleeve its lugs 68 engage disk 67 so that the supplemental closure structure 64 is moved to open position and armature 62 is brought into engagement with the pole faces of core 60. The inlet 20—21 of the casing is then in communication (by way of plug-opening 24 and cavity 31) with the region beyond the smaller end of the plug, which region is connected by a small passage 72 to a pilot-burner connection indicated at 73 in Fig. 1.

While holding knob 56 in "reset" position against the force of spring 69 of the safety device, energization of electromagnet 60—61 is effected (as by lighting a pilot burner supplied with gas through connection 73) so that upon release of the knob the armature is retained in engagement with core 60 and closure structure 64 in open position. When the knob is then rotated in clockwise direction to effect normal operation of the plug, the cam surfaces of the sleeve ride on those of the plug so that the sleeve returns to its normal position inside the plug and is automatically locked in that position when, upon slight clockwise rotation of the plug, the lock-ring is moved out of engagement with stop 71 and rotates to locking position under the force of its bias spring. Flow through the main passages of the valve casing can then be controlled by rotation of the plug between its "on" and "off" positions. When the plug is in its "off" position its inlet and outlet openings are out of communication with the inlet and outlet of the casing so that the parts inside the plug can be removed (as for repair or replacement) without the necessity for turning-off the supply of gas or other fluid.

During initial clockwise rotation of the knob (before the sleeve has returned to normal driving position) the plug remains stationary due to friction between it and its socket so that the lock-ring is retained in unlocking position in engagement with stop 71, and the edge of portion 48 of the ring is just out of engagement with the adjacent surface 74 of the sleeve, which surface (as well as the similar surface 75) are inclined merely to provide clearance.

In the event that the electromagnet is not properly energized when the knob is released after the resetting operation (due, for example, to the continued existence of an unsafe condition) the sleeve then returns, under the force of spring 69, to its previous position within the plug and the supplemental closure 64 is reseated. Deenergization of holding-magnet 60—61 while the plug is in any normal operating position obviously effects immediate release of the armature and seating of the supplemental closure.

The foregoing description of the operation of the valve structure of Figs. 1–4 may more readily be understood by reference to the diagrams of Figs. 5–7. These diagrams correspond generally to developed or unfolded views of the inside of the rotatable unit shown in the exploded view of Fig. 4 and show the parts in the various operative positions between which they are slidable in the diagrams. The diagram parts have been assigned the same numerals as those of the corresponding parts of the structure, but with a prime mark added. In Fig. 5 the plug 19' is interlocked with sleeve 35' by ring 42' so that these parts can be slid as a unit in normal operation. In Fig. 6 the parts have been slid to the left to a position wherein ring 42' is unlocked due to engagement with stop 71' so that with continued movement of driving-arm 58' to the left sleeve 35' rises to the "reset" position of Fig. 7.

Figure 8 indicates how the present invention may be applied to a valve of the rotary-disk or rotary-cap type. In this figure the numeral 101 indicates a valve casing having flow passages 102 and 103 and vertical inner extensions 104 and 105. On the flat top of the valve casing, and held in sealing engagement therewith by a ring 106, is a circular closure member 107 of the rotary-cap type having apertures therethrough comprising vertical portions 108 and 109 which are in register with the casing-passage extensions 104 and 105 when the closure member is in open position as shown and are interconnected by a horizontal portion 110. Fitting around closure member 107 is an inverted cup 111 whose lower edge is formed to provide a cam 112 cooperable with a cam 113 on the closure member.

The cup 111 is normally interlocked with the closure member by a spring-pressed pin 114 mounted on the cup and projecting into a conforming recess in the closure member so that rotation of the cup, by means of its handle 115, normally effects corresponding rotation of the closure member. Suitable means (not shown, but obvious to workers in the art) are provided at the back of the valve casing for withdrawing the locking pin 114 when the cap and closure member are rotated, as a unit, to "resetting" position, so that continued rotation effects rise of cup 111 under the influence of cams 112 and 113 and corresponding rise of a rod 116 secured to the cup and to which a supplemental control device may be connected.

In Fig. 8, the cap-type closure member 107 corresponds to plug member 19 in the structure of Figs. 1–4, the cup 111 corresponds to sleeve 35, and locking pin 114 to lock-ring 42.

The specific embodiments of our invention herein shown and described are obviously susceptible of modification without departing from the spirit of the invention, and we intend therefore to be limited only by the scope of the appended claims.

We claim as our invention:

1. In a valve structure: a casing having an inlet and an outlet passage for flow through the casing; a closure member adapted to obstruct flow between said passages and having an aperture adapted to interconnect the passages so as to permit such flow; means for mounting said closure member on said casing so that it is rotatable relative to the casing, to control flow therethrough, between one position wherein flow is obstructed by the closure member and another position wherein said passages are interconnected by said aperture; a member for operating said closure member; means for mounting said operating member on the closure member so that it is capable of rotating relative to the closure member through a small angle and about the axis of rotation of the closure member; means defining cooperating cam surfaces on the closure member and on the operating member such that said relative rotation of the operating member effects also axial movement of the same relative to the closure member; means mounted on one of said members for interlocking the members so that said relative movements of the members are then prevented and the members and said locking means form an interlocked unit rotatable to control flow through the casing; means on the casing, engageable by the locking means when said unit is rotated, for unlocking the locking means when the unit reaches a predetermined position so that said relative rotation and axial movement of the operating member are then permitted; supplemental control means; and means for connecting said operating member to said supplemental control means so that said axial movement of the operating member effects actuation of the supplemental control means.

2. In a valve structure: a casing having an inlet and an outlet passage for flow through the casing; a closure member adapted to obstruct flow between said passages and having an aperture adapted to interconnect the passages so as to permit such flow; means for mounting said closure member on said casing so that it is rotatable relative to the casing, to control flow therethrough, between one position wherein flow is obstructed by the closure member and another position wherein said passages are interconnected by said aperture; a member for operating said closure member; means for mounting said operating member on the closure member so that it is capable of rotating in one direction relative to the closure member through a small angle and about the axis of rotation of the closure member; means defining cooperating cam surfaces on the closure member and on the operating member such that said relative rotation of the operating member effects also axial movement of the same relative to the closure member; means mounted on one of said members for interlocking the members and movable between locking and unlocking positions, means biasing said locking means to locking position wherein said relative rotation and axial movement of the operating member is prevented so that the members and the locking means then form an interlocked unit rotatable to control flow through the casing; means on the casing, engageable by the locking means in the rotation of said unit in said one direction, for moving the locking means to unlocking position when the unit reaches a predetermined position so that continued rotation of the members in said direction then effects said axial movement of the operating member; supplemental control means; and means for connecting said operating member to said supplemental control means so that said axial movement of the operating member effects actuation of the supplemental control means.

3. In a valve structure: a casing having a passage therethrough and a plug-socket in said passage; an apertured plug fitting snugly in said socket and rotatable therein to control flow through said passage, said plug having also an inner cavity around its axis of rotation; a member in said cavity for operating the plug; means for mounting said operating member on the plug so that it is capable of rotating relative to the plug about said plug-axis through a small angle; means on said operating member and on a wall of said cavity defining cooperating cam surfaces arranged so that said relative rotation of the operating member effects also axial movement thereof; means interlocking the operating member and the plug so that said rotation of the operating member relative to the plug is then prevented and rotation of the operating member causes corresponding rotation of the plug; means on said casing for operating said interlocking means to unlocking position when the operating member and the plug are rotated as a unit to a predetermined position so that said relative rotation and axial movement of the operating member are then permitted; supplemental control means; and means for connecting said operating member to said supplemental control means so that said axial movement of the operating member effects actuation of the supplemental control means.

4. In a valve structure: a casing having a flow passage therethrough and a plug-socket in said passage; an apertured plug member fitting snugly in said socket and rotatable therein between open and closed positions, said plug member having also an inner cavity around its axis of rotation; a member in said cavity for operating the plug member; means for mounting said operating member in the cavity so that it is capable of rotating freely in one direction relative to the plug member about said plug-axis through a small angle; means on said operating member and on a wall of said cavity defining cooperating cam surfaces arranged so that said relative rotation of the operating member effects also axial movement thereof; means mounted on one of said members for interlocking the members and movable between locking and unlocking positions, means biasing said locking means to locking position wherein said relative rotation and axial movement of the operating member is prevented so that the members and the locking means then form an interlocked unit rotatable to control flow through the casing; means on the casing, engageable by the locking means in the rotation of said unit in said one direction and while the plug member is in closed position, for moving the locking means to unlocking position when the unit reaches a predetermined position so that continued rotation of the members in said direction then effects said axial movement of the operating member; supplemental means for controlling flow through the casing; and means for connecting said operating member to said supplemental flow-controlling means so that said axial movement of the operating member effects actuation of the supplemental flow-controlling means.

5. In a valve structure: a casing having a passage therethrough and a plug-socket in said passage; an apertured plug member fitting snugly in said socket and rotatable therein between open and closed positions to control flow through said passage, the apertures of said plug member comprising an elongated generally-cylindrical inner cavity around the axis of rotation of the plug member and openings for connecting the cavity with the casing-passage; a member in said cavity for operating the plug member; means for mounting said operating member in the cavity so that it is capable of rotating freely in one direction relative to the plug member about said axis through a small angle; means on said operating member and on a wall of said cavity defining cooperating cam surfaces arranged so that said relative rotation of the operating member effects also axial movement thereof; means mounted on one of said members for interlocking the members and movable between locking and unlocking positions, means biasing said locking means to locking position wherein said relative rotation and axial movement of the operating member is prevented so that the members and the locking means then form an interlocked unit rotatable to control flow through the casing; means sealingly extending to the exterior of the casing for manually rotating the operating member; means on the casing, engageable by the locking means in the rotation of said unit in said one direction, for moving the locking means to unlocking position when the unit reaches a predetermined position so that continued rotation of the members in said direction then effects said axial movement of the operating member; supplemental valve means in said plug-member cavity for controlling flow therethrough; and means on the operating member operatively cooperable with said supplemental valve means in said axial movement thereof.

6. A valve structure according to claim 5, and wherein said operating member has an opening therethrough, coaxial with the plug member, for flow through said cavity.

7. A valve structure according to claim 5, and wherein said operating member is generally cylindrical and said cooperating cam surfaces are on the adjacent side walls of the operating member and of said cavity.

8. A valve structure according to claim 5, and wherein said operating member consists of a sleeve conforming generally to the side wall of said cavity and having an edge defining one of said cooperating cam surfaces.

9. A valve structure according to claim 5, and wherein said operating member consists of a sleeve conforming generally to the side wall of said cavity and having an inwardly projecting portion operatively engageable with said supplemental valve means.

10. A valve structure according to claim 5, and wherein said supplemental valve means comprises an annular valve seat in said cavity and in a plane transverse to the axis of the plug member, and a closure movable in directions normal to said plane into and out of engagement with said seat.

11. A valve structure according to claim 5, and wherein said interlocking means comprises an annular member mounted on the plug member coaxially therewith.

12. A valve structure according to claim 5, and wherein said means engageable by said locking means serves also as stop means for preventing rotation of the plug member in said one direction when the locking means is in unlocking position.

13. A valve structure according to claim 5, and including an electromagnet, mounted on the casing and projecting into said cavity, for influencing said supplemental valve means.

14. A valve structure according to claim 5 wherein said operating member consists of a sleeve conforming generally to the side wall of said cavity, and including an electromagnetic operator, mounted on the casing and projecting inside said sleeve, for influencing said supplemental valve means.

References Cited in the file of this patent
UNITED STATES PATENTS

| | | |
|---|---|---|
| 2,447,207 | Ray | Aug. 17, 1948 |
| 2,556,337 | Paille | June 12, 1951 |
| 2,664,103 | Ray | Dec. 29, 1953 |